United States Patent [19]

Hill et al.

[11] 4,451,290

[45] May 29, 1984

[54] RECOVERY OF PLATINUM GROUP METALS FROM SCRAP AND RESIDUES

[75] Inventors: John Hill, Sandton, South Africa; Joseph G. Day, Holmer Green, England

[73] Assignee: Matthey Rustenburg Refiners (Proprietary) Limited, Johannesburg, South Africa

[21] Appl. No.: 418,541

[22] Filed: Sep. 15, 1982

[30] Foreign Application Priority Data

Sep. 16, 1981 [GB] United Kingdom ............... 8127976

[51] Int. Cl.$^3$ ............................................. C22B 11/00
[52] U.S. Cl. ............................................. 75/63; 75/83
[58] Field of Search ....................................... 75/83, 63

[56] References Cited

U.S. PATENT DOCUMENTS 4,135,923 1/1979 Day ........................................ 75/83

FOREIGN PATENT DOCUMENTS 1481295 7/1977 United Kingdom ............. 75/118 R

*Primary Examiner*—M. J. Andrews
*Attorney, Agent, or Firm*—Cushman, Darby & Cushman

[57] ABSTRACT

A process for the recovery of platinum group metals, Ag and Au from a precious metal containing residue which includes the platinum group metals, Ag and Au together with Fe, Cu, Ni, Se and Te, the process comprising the following steps:

(a) smelting the precious metal containing residue with leach residue including S and a flux to product (i) a slag and (ii) a copper matte phase containing S, the platinum group metals, Au, Ag, Se and Te, and an excess of Ni and/or Fe as defined in step (b) below, (b) removing excess of the elements Fe or Ni or compounds thereof from the matte phase produced by step (a) by oxidation thus converting the elements or compounds thereof to their respective oxides which then report to the slag phase, the excess being defined as more than about 10% by weight of iron, more than about 15% by weight of nickel or more than about 20% by weight of the total of iron and nickel, based on the weight of the matte phase, (c) contacting the matte phase produced after oxidation step (b) in liquid form with one or more molten metals selected from the group consisting of Cu, Ni and Fe so as to produce a separate immiscible metallic phase containing platinum group metals, silver and gold, and (d) recovering silver from the matte phase and the platinum group metals, gold and the proportion of silver which remains from the metallic phase.

11 Claims, No Drawings

RECOVERY OF PLATINUM GROUP METALS FROM SCRAP AND RESIDUES

This invention relates to the recovery of platinum group metals and gold and silver from scrap and residues and also to the separation of silver from the other precious metals referred to.

Residues containing precious metals arise from many sources. For example processes which recover base metals such as nickel, copper, cobalt etc by leaching in an acid or alkaline medium will often leave a residue containing precious metals and sulphur.

Another example of residues which may advantageously be treated by this invention is that of residues arising from processes employing precious metals as catalysts in chemical or metallurgical operations. There are numerous other residue materials which will be known to those familiar with precious metal technology and use, and this invention will be readily adaptable to give an advantageous recovery procedure. These residues are collectively referred to herein as "precious metal containing residue".

It is an important object of the present invention to enable a major portion of any silver present in the input residues to be recovered in isolation from the platinum group metals and gold.

In primary refining operations for platinum group metals, high sulphur content base metal sulphide residues are produced which contain Ag, Te, Se and platinum group metals gold and other elements which may be deleterious to subsequent operations. During the production of the aforesaid residues acid leaching has removed the bulk of the Cu and Ni present and the leach residue which then remains contains elemental and combined sulphur, platinum group metals and gold, Ag, Se and Te and refractory oxides such as $SiO_2$, $Al_2O_3$, MgO and CaO. This product is referred to herein as "leach residue". Such a product cannot be recirculated to earlier stages of the process without the prior elimination of elements such as Se and Te which would otherwise build up to unacceptable levels.

According to one aspect of the present invention a process for the recovery of platinum group metals, silver and gold from precious metal containing residue comprises the following steps:

(a) smelting the said precious metal containing residue with leach residue and a flux to produce
  (i) a slag containing FeO, CaO and $SiO_2$ and
  (ii) a copper matte phase containing Ni, Fe, S, the platinum group metals, Au, Ag, Se and Te, (b) removing, if necessary, any excess of the elements iron or nickel or compounds thereof from the matte phase produced by step (a) by oxidation thus converting the said elements or compounds thereof to their respective oxides which then report to the slag phase, (c) contacting the matte phase produced by step (a) or the said matte phase after oxidation step (b) with one or more metals selected from the group Cu, Ni and Fe so as to produce a separate immiscible metallic phase containing platinum group metals, silver and gold, (d) optionally recirculating the said separate metallic phase produced by step (c) to contact a separately produced matte phase produced by a step (a) or by steps (a) and (b) so as to at least partially redistribute the silver present out of the metallic phase and (e) recovering silver from the matte phase and the platinum group metals, gold and the proportion of silver which remains from the metallic phase.

The platinum group metal content of the combined residues may be up to 10% by weight and the silver content should preferably not exceed 5% by weight of the combined weight of precious metal containing residue and leach residue.

Smelting may be carried out at step (a) of this invention by any convenient method. Suitable fluxes for smelting the precious metal containing and leach residues at step (a) are iron oxide, silica, lime, $Ca(OH)_2$, alkali metal carbonate, alkali metal chloride and an iron silicate based slag also containing CaO and MgO. The preferred flux is iron silicate which has an approximate composition range:

|         | % W/W  |      |
|---------|--------|------|
| CaO     | 1–30   | (25) |
| MgO     | 0–20   | —    |
| FeO     | 20–60  | (45) |
| $SiO_2$ | 30–45  | (30) | where the preferred composition is given in parentheses. It is preferred to add flux within the range 2–3 times the weight of the combined weight of precious metal-containing residue and leach residue. The smelting operation is preferably carried out in air at a temperature within the range 1100°–1300° C. $SO_2$ may be evolved as a gas during the smelting operation.

Copper is the major element present in the copper matte phase produced at step (a). If the proposed matte:bullion ratio is 4:1 the iron and nickel contents of the matte should not exceed the following concentrations, namely Fe 7%, Ni 10% and Fe plus Ni 13% with the stated maximum for each element (combined or uncombined). If the matte:bullion ratio is 1:1 the corresponding figures are Fe 10%, Ni 15% and Fe plus Ni 20% with the stated maximum for each element (combined or uncomined). The excess quantities of these metals need to be removed from the matte phase. We prefer to perform this operation at step (b) by conversion of the said elements to their respective oxides which then redistribute to the slag. Fe and Fe compounds are converted to FeO and Ni and Ni compounds to NiO. A suitable method of oxidation is by oxygen or air lancing at a temperature of 1200°–1250° C.

When Cu, Ni or Fe either individually or as an alloy are brought into contact with the matte in performing step (c) the said metal (or alloy) is molten and matte must be in the liquid state. A separate immiscible metallic phase is produced and is formed by the said Cu and/or Ni and/or Fe which is added. Cu is the preferred metal for addition. The distribution coefficients of the platinum group metals and gold favour the metallic rather than the matte phase and these elements therefore collect in the metallic phase. The distribution coefficients of Se and Te which are deleterious to subsequent platinum group metal separation favour the matte phase, however.

An alternative to the addition of copper to the matte at step (c) is to continue the oxidation step (b) by continuing injection of oxygen or air into the matte phase until a sufficient proportion of $Cu_2S$ is converted to Cu metal:

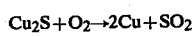

Some Cu converts to the oxide and becomes associated with the slag but we have found sufficient Cu metal is formed by this procedure to form a separate immiscible metallic phase which can act as a collector for the platinum group metals and gold.

"Contacting" at step (c) may therefore take place either by specific addition of metal or by the production of metal in situ.

The economic viability of the present invention may be improved by increasing the level of platinum group metals recovered in the separate immiscible metallic phase and at the same time minimising the concentration of Ag metal therein. These objectives are achieved by optional step (d) in which the immiscible metallic (bullion) phase is recirculated to contact a separately produced matte phase produced by a step (a) or a combination of steps (a) and (b). For ease of operation this separately produced phase is preferably produced subsequently although it may of course be produced earlier.

We have found that by bringing the phases into contact in this way the concentration of platinum group metal in the metallic or bullion phase is increased without detriment to its recovery. However, because the distribution coefficient of Ag between the two phases is close to unity, subsequent segregation of silver into the metallic phase is considerably reduced. The net effect of recirculation is to significantly improve the effective separation of the platinum group metals from the silver.

Recovery of the silver, platinum group metals and gold from their respective phases in step (e) may be peformed by known methods. Examples of processes which may be used to recover the silver in the matte are as follows:

(a) The matte may be blown either in a Peirce Smith or Top Blown Rotary converter to blister copper-silver. The latter can then be either electro-refined, preferably in a divided cell where the silver may be cemented with copper or the blister copper can be atomised and leached in $H_2SO_4$ with an oxidising agent, such as $HNO_3$. The silver in the residue may then be refined in a Balbach cell.

(b) The matte is crushed, ground and leached directly in an autoclave with $H_2SO_4$ under air pressure of greater than 20 Bar and a temperature greater than 120° C. The silver in the residue may be electro-refined either in a Balbach cell or dissolved in $HNO_3$ and electro-refined in a Moebuis cell.

(c) The matte is crushed, ground and roasted at a temperature greater than 750° C. to oxidise the sulphide. The roasted product can then be leached with $H_2SO_4$ at atmospheric pressure and a temperature greater than 80° C. The silver in the residue may be recovered as in (b) above.

EXAMPLE 1

A leach residue and a precious metal-containing residue were used containing:

|  | Leach Residue wt % | Precious Metal-containing Residue wt % |
| --- | --- | --- |
| Pt | 0.003 | 7.09 |
| Pd | 0.018 | 1.56 |
| Rh | 0.021 | 1.74 |
| Ir | 0.002 | 1.26 |
| Ru | 0.039 | 4.63 |
| Au | 0.008 | 2.11 |
| Ag | 0.14 | 10.96 |
| Cu | 6.5 | 7.3 |
| Ni | 1.3 | 3.1 |
| Fe | 27.8 | 5.8 |
| Se | 0.6 | 0.6 |
| Te | 0.2 | 0.1 |
| S | 10.5 | 1.6 |

The residues were smelted together in the ratio 20:1 with 10% by weight iron oxide, 2% by weight sillica and 5% by weight lime to produce an olivine slag and a matte. The weight of the matte represented approximately 50% of the total input residues and contained the following:

|  | % w/w |
| --- | --- |
| Pt | 0.762 |
| Pd | 0.196 |
| Rh | 0.227 |
| Ir | 0.155 |
| Ru | 0.602 |
| Au | 0.242 |
| Ag | 1.30 |
| Cu | 12.5 |
| Ni | 3.3 |
| Fe | 51.3 |
| S | 21.3 |
| Se | 1.19 |
| Te | 0.13 |

In accordance with the present invention the iron was blown down by oxygen lancing to 5.8% by weight and a 1:4 addition of copper added to the matte. The bullion phase was analysed and the overall recovery of platinum group metals, gold and silver into the bullion was as follows:

|  | % w/w |
| --- | --- |
| Pt | 99.5 |
| Pd | 87.7 |
| Rh | 95.4 |
| Ir | 97.6 |
| Ru | 99.3 |
| Au | 97.7 |
| Ag | 29.7 |

EXAMPLE 2

A further sample of the leach residue was smelted with 1% of a precious metal-containing residue to produce a matte containing:

|  | wt % |
| --- | --- |
| Pt | 0.12 |
| Pd | 0.07 |
| Rh | 0.08 |
| Ir | 0.05 |
| Ru | 0.16 |
| Au | 0.06 |
| Ag | 0.45 |
| Cu | 12.7 |
| Ni | 3.2 |
| Fe | 54.8 |
| S | 21.6 |

| | wt % |
|---|---|
| Se | 1.21 |
| Te | 0.14 |

Approximately 3 times the weight of preformed CuO.-FeO.SiO$_2$ (Olivine) slag was added to the matte and oxygen introduced until the iron content of the matte was reduced to 2.0% the so-formed matte contained:

| | % w/w |
|---|---|
| Cu | 54.0 |
| Ni | 10.5 |
| Fe | 2.0 |
| S | 15.0 |
| Se | 1.8 |
| Te | 0.2 |
| PGMs + Au | 9.0 |
| Ag | 2.7 |

Molten copper in an amount of 25 wt % was brought into contact with the above liquid matte, in accordance with the present invention, to give and bullion phase containing the following:

| | Matte % w/w | Bullion % w/w |
|---|---|---|
| Pt | 0.011 | 4.53 |
| Pd | 0.059 | 1.11 |
| Rh | 0.020 | 1.23 |
| Ir | <0.01 | 1.24 |
| Ru | <0.01 | 4.58 |
| Au | 0.020 | 1.49 |
| Ag | 1.906 | 2.41 |
| Cu | 70.5 | 69.5 |
| Ni | 3.3 | 8.1 |
| Fe | 1.5 | 0.9 |
| S | 18.31 | 3.17 |
| Se | 1.80 | 0.28 |
| Te | 0.19 | 0.07 |

Overall recovery into the bullion was as follows:

| | wt % Recovery |
|---|---|
| Pt | 98.5 |
| Pd | 77.2 |
| Rh | 92.5 |
| Ir | 94.8 |
| Ru | 96.4 |
| Au | 92.0 |
| Ag | 25.7 |

EXAMPLE 3

The leach residue described in example 1 was smelted with two additional precious metal-containing residues (designated No. 1 and No. 2) in the ratio 10:0.5:0.7, and approximately 10% iron oxide, 2% silica and 5% lime by weight, overall. The two additional residues contained the following:

| | Residue 1 % w/w | Residue 2 % w/w |
|---|---|---|
| Pt | 7.20 | 6.00 |
| Pd | 1.63 | 3.58 |
| Rh | 1.75 | 3.85 |
| Ir | 1.08 | 2.42 |
| Ru | 4.73 | 6.77 |
| Au | 2.09 | 6.58 |
| Ag | 10.82 | 34.97 |

The matte produced represented approximately 45% of the input residue weight and the iron removal stage reduced the matte weight to approximately 10% of the input residue weight. The final matte contained the following:

| | % w/w |
|---|---|
| Pt | 5.81 |
| Pd | 2.35 |
| Rh | 2.68 |
| Ir | 2.51 |
| Ru | 6.26 |
| Au | 3.88 |
| Ag | 18.27 |
| Cu | 35.5 |
| Ni | 5.4 |
| Fe | 0.3 |
| S | 9.1 |
| Se | 3.05 |
| Te | 0.65 |

Because of the relatively high platinum group metal content the above matte was diluted. Copper sulphide and nickel sulphide were added to give concentrations of PGMs approximately 4.4% by weight. The resulting matte contained 55.5% Cu, 15.3% Ni, 0.1% Fe, 19.9% S and approximately 4.4% (PGMs+Au). Copper was added so that the bullion produced had a melting point consistent with operation of the process at 1200°-1300° C. The addition of 25 wt % copper to this matte gave the following recoveries into the bullion:

| | Matte % w/w | Bullion % w/w |
|---|---|---|
| Pt | 0.012 | 2.36 |
| Pd | 0.105 | 0.85 |
| Rh | 0.034 | 1.04 |
| Ir | <0.01 | 0.87 |
| Ru | 0.04 | 2.40 |
| Au | 0.067 | 1.64 |
| Ag | 2.844 | 2.61 |
| Cu | 66.9 | 57.3 |
| Ni | 8.5 | 20.0 |
| Fe | 0.15 | 0.13 |
| S | 17.85 | 7.48 |

Overall, recovery into the bullion was:

| | % w/w |
|---|---|
| Pt | 98.9 |
| Pd | 79.7 |
| Rh | 93.7 |
| Ir | 97.7 |
| Ru | 96.6 |
| Au | 92.2 |
| Ag | 30.7 |

EXAMPLE 4

The leach residue was smelted with 5 wt % of the precious metal-containing residue described in Example 1 and fluxes comprising 10 wt % iron oxide, 2 wt % silica and 6 wt % lime to produce matte and slag in the ratios 1:1.5; the matte contained the following:

|     | % w/w  |
| --- | ------ |
| Pt  | 0.762  |
| Pd  | 0.196  |
| Rh  | 0.227  |
| Ir  | 0.155  |
| Ru  | 0.602  |
| Au  | 0.242  |
| Ag  | 1.30   |
| Cu  | 12.48  |
| Ni  | 3.31   |
| Fe  | 51.29  |
| S   | 21.32  |
| Se  | 1.19   |
| Te  | 0.13   |

The iron content of the matte was reduced to less than 1% by oxygen blowing. The resulting matte comprised only 15 wt % of the smelt matte and contained the following.

|     | % w/w |
| --- | ----- |
| Pt  | 4.25  |
| Pd  | 0.99  |
| Rh  | 1.22  |
| Ir  | 0.91  |
| Ru  | 3.30  |
| Au  | 1.25  |
| Cu  | 49.1  |
| Ni  | 10.2  |
| Fe  | 0.6   |
| S   | 13.9  |

The blown matte was diluted with copper sulphide in order to produce a matte containing lower levels of nickel plus iron and hence maximise recovery of platinum group metals in bullion production. The matte contained:

|           | % w/w |
| --------- | ----- |
| Cu        | 68.9  |
| Ni        | 3.7   |
| Fe        | 0.25  |
| S         | 17.8  |
| PGMs + Au | 4.3   |

Molten copper in an amount of 25 wt % copper was added to the above matte to produce a matte and bullion phase having the following composition:

|     | Matte % w/w | Bullion % w/w |
| --- | ----------- | ------------- |
| Pt  | 0.011       | 3.86          |
| Pd  | 0.049       | 0.82          |
| Rh  | 0.018       | 1.02          |
| Ir  | <0.01       | 1.02          |
| Ru  | 0.02        | 3.70          |
| Au  | 0.018       | 1.12          |
| Ag  | 1.461       | 1.90          |
| Cu  | 71.8        | 71.6          |
| Ni  | 3.42        | 7.53          |
| Fe  | 0.40        | 0.22          |
| S   | 18.10       | 3.04          |
| Se  | 1.29        | 0.29          |
| Te  | 0.13        | 0.06          |

Platinum group metal Au and Ag recovery into the bullion was as follows:

|     | % w/w |
| --- | ----- |
| Pt  | 99.2  |
| Pd  | 86.1  |
| Rh  | 95.4  |
| Ir  | 97.9  |
| Ru  | 98.6  |
| Au  | 95.8  |
| Ag  | 32.4  |

We claim:

1. A process for the recovery of platinum group metals, Ag and Au from a precious metal containing residue which includes the platinum group metals, Ag and Au together with Fe, Cu, Ni, Se and Te, said process comprising the following steps:
    (a) smelting the said precious metal containing residue with leach residue including S and a flux to produce
        (i) a slag and
        (ii) a copper matte phase containing S, the platinum group metals, Au, Ag, Se and Te, and an excess of Ni and/or Fe as defined in step (b) below,
    (b) removing excess of the elements Fe or Ni or compounds thereof from the matte phase produced by step (a) by oxidation thus converting the said elements or compounds thereof to their respective oxides which then report to the slag phase, said excess being defined as more than about 10% by weight of iron, more than about 15% by weight of nickel or more than about 20% by weight of the total of iron and nickel, based on the weight of the matte phase,
    (c) contacting the matte phase produced after oxidation step (b) in liquid form with one or more molten metals selected from the group consisting of Cu, Ni and Fe so as to produce a separate immiscible metallic phase containing platinum group metals, silver and gold, and
    (d) recovering silver from the matte phase and the platinum group metals, gold and the proportion of silver which remains from the metallic phase.

2. A process according to claim 1, wherein the smelting operation in step (a) is carried out at a temperature within the range 1100°–1300° C.

3. A process according to claim 1 or claim 2, wherein the flux for the smelting of the leach and precious metal-containing residues of step (a) is selected from the group consisting of iron oxide, silica, lime, Ca(OH)$_2$, alkali metal carbonate, alkali metal chloride and an iron silicate based slag also containing CaO and MgO.

4. A process according to claim 1, wherein the weight of flux added to leach and precious metal-containing residues is 2–3 times the weight of the said residues.

5. A process according to claim 3, wherein the iron silicate based slag has the following composition:

|         | % w/w |
| ------- | ----- |
| CaO     | 1–30  |
| MgO     | 0–20  |
| FeO     | 20–60 |
| SiO$_2$ | 30–45 |

6. A process according to claim 1, wherein the oxidation at step (b) is carried out at a temperature within the range 1200°–1250° C.

7. A process according to claim 1, wherein contacting at step (c) is carried out when the said metal or alloy of metals is molten and the matte is in the liquid state.

8. A process according to claim 7, wherein the said metal is copper.

9. A process according to claim 1, wherein contacting at step (c) is effected by the in situ production of metal.

10. A process according to claim 9, wherein the in situ production of metal is obtained by continuing the injection of oxygen or air into the matte phase of step (b).

11. A process according to claim 1 which includes the step of recirculating the separate metallic phase produced by step (c) and contacting the same with a separately produced matte phase produced by step (a) or by steps (a) and (b) so as to at least partially redistribute the silver present out of the metallic phase.

* * * * *